US010755555B2

(12) United States Patent
Norton et al.

(10) Patent No.: US 10,755,555 B2
(45) Date of Patent: Aug. 25, 2020

(54) METHOD AND APPARATUS FOR VERIFYING SERVICE OF INSTALLED DEVICES USING RFID

(71) Applicant: Tyco Fire & Security GmbH, Neuhausen am Rheinfall (CH)

(72) Inventors: Alexandra K. Norton, Duxbury, MA (US); Tyler H. Brown, New Haven, CT (US); Alessandro Scanu, Grange (IE)

(73) Assignee: Johnson Controls Fire Protection LP, Boca Raton, FL (US)

( * ) Notice: Subject to any disclaimer, the term of this patent is extended or adjusted under 35 U.S.C. 154(b) by 0 days.

(21) Appl. No.: 15/707,161

(22) Filed: Sep. 18, 2017

(65) Prior Publication Data

US 2019/0088109 A1 Mar. 21, 2019

(51) Int. Cl.
*G08B 29/00* (2006.01)
*G08B 29/14* (2006.01)
(Continued)

(52) U.S. Cl.
CPC ..... *G08B 29/145* (2013.01); *G06Q 10/06311* (2013.01); *G06Q 10/20* (2013.01); *G08B 29/14* (2013.01); *H04B 17/318* (2015.01)

(58) Field of Classification Search
CPC ...... G08B 29/145; G08B 29/14; G08B 29/12; G08B 17/00; G08B 17/10; G08B 3/10;
(Continued)

(56) References Cited

U.S. PATENT DOCUMENTS 6,150,936 A * 11/2000 Addy .................. G08B 25/10
340/506
7,633,392 B2 * 12/2009 Neuwirth ............. G06Q 20/203
235/385
(Continued)

FOREIGN PATENT DOCUMENTS

CN 103413139 11/2013
CN 104501963 A 4/2015
(Continued)

OTHER PUBLICATIONS

European Search Report, dated Mar. 4, 2019, from European Patent Application No. 18194957.9, filed on Sep. 17, 2018. 10 pages.
(Continued)

*Primary Examiner* — Anh V La
(74) *Attorney, Agent, or Firm* — HoustonHogle LLP

(57) ABSTRACT

A service management system validates service on building management systems. Devices of the building management systems include wireless transmitters (for example, radiofrequency identification (RFID) tags) for transmitting wireless signals containing identification information. During service, a technician reads the identification information using a mobile computing device (for example, an RFID reader) while also recording the signal strength of the wireless signals. The mobile computing sends the identification information and signal strength information to a connected services system along with information about the service, and a validation module confirms that the identification information and signal strength information indicates that the technician was actually in the vicinity of the devices that were serviced.

25 Claims, 5 Drawing Sheets

(51) Int. Cl.
*H04B 17/318* (2015.01)
*G06Q 10/00* (2012.01)
*G06Q 10/06* (2012.01)

(58) Field of Classification Search
CPC .. G08B 17/113; G08B 29/185; G08B 25/008; G08B 29/00; G08B 29/04; G08B 13/00; G08B 29/02; G08B 29/043; G08B 17/117; G08B 25/016; G08B 29/06; G08B 29/26; G08B 21/18; G08B 27/00; G08B 29/10; H04B 17/318; G05B 19/0428; G05B 19/0425; H04L 12/2818; H04L 12/2825; H04L 12/2803; G06Q 10/06311; G06Q 10/20
USPC .............. 340/514, 506, 540, 521, 577, 584
See application file for complete search history.

(56) References Cited

U.S. PATENT DOCUMENTS

| | | | |
|---|---|---|---|
| 9,900,115 B2 * | 2/2018 | Rauworth | H04B 17/23 |
| 2004/0204977 A1 | 10/2004 | Obert | |
| 2004/0217857 A1 | 11/2004 | Lennartz et al. | |
| 2007/0232288 A1 | 10/2007 | McFarland et al. | |
| 2008/0084291 A1 * | 4/2008 | Campion | G08B 29/123 340/514 |
| 2008/0218330 A1 | 9/2008 | Biles et al. | |
| 2009/0256699 A1 | 10/2009 | Huseth et al. | |
| 2010/0286937 A1 | 11/2010 | Hedley et al. | |
| 2012/0259583 A1 | 10/2012 | Noboa et al. | |
| 2013/0169681 A1 | 7/2013 | Rasane et al. | |
| 2013/0308674 A1 | 11/2013 | Kramer et al. | |
| 2014/0119674 A1 | 5/2014 | Das et al. | |
| 2014/0218164 A1 | 8/2014 | Mahapatra et al. | |
| 2014/0292348 A1 | 10/2014 | Kanne et al. | |
| 2015/0051749 A1 | 2/2015 | Hancock et al. | |
| 2015/0142491 A1 | 5/2015 | Webb | |
| 2015/0260541 A1 | 9/2015 | Smith | |
| 2015/0261229 A1 * | 9/2015 | Roy | G05B 15/02 700/277 |
| 2015/0262114 A1 | 9/2015 | Ming | |
| 2015/0308704 A1 | 10/2015 | Jung et al. | |
| 2015/0312696 A1 | 10/2015 | Ribbich et al. | |
| 2015/0316907 A1 | 11/2015 | Elbsat et al. | |
| 2015/0327010 A1 | 11/2015 | Gottschalk et al. | |
| 2016/0117785 A1 | 4/2016 | Lerick et al. | |
| 2016/0187127 A1 | 6/2016 | Purohit et al. | |
| 2016/0313023 A1 | 10/2016 | Przybylski et al. | |
| 2016/0327293 A1 | 11/2016 | Grabowski et al. | |
| 2017/0011312 A1 | 1/2017 | Subramanian et al. | |
| 2017/0074536 A1 | 3/2017 | Bentz et al. | |
| 2017/0090441 A1 | 3/2017 | Schmitt et al. | |
| 2017/0188188 A1 * | 6/2017 | Kang | H04W 4/029 |
| 2017/0213303 A1 | 7/2017 | Papadopoulos et al. | |
| 2017/0351278 A1 | 12/2017 | Raghavan et al. | |
| 2018/0279067 A1 * | 9/2018 | Ivanov | H04B 17/318 |
| 2019/0325368 A1 | 10/2019 | Turney et al. | |

FOREIGN PATENT DOCUMENTS

| | | |
|---|---|---|
| KR | 1908865 B1 | 10/2018 |
| WO | WO 2012130670 | 10/2012 |

OTHER PUBLICATIONS

European Search Report dated Feb. 28, 2019 for European Patent Application No. 18194954.6 filed Sep. 17, 2018. 10 pages.
Partial European Search Report, dated Feb. 15, 2019, from European Application No. 18195315.9, filed on Sep. 18, 2018. 12 pages.
European Search Report, dated May 22, 2019, from European Application No. 18195315.9, filed on Sep. 18, 2018. 10 pages.
European Search Report dated Mar. 1, 2019, from European Patent Application No. 18194955.3 filed Sep. 17, 2018. 9 pages.
European Search Report, dated Mar. 6, 2019, from European Patent Application No. 18194956.1, filed on Sep. 17, 2018. 9 pages.
European Search Report, dated Feb. 20, 2019, from European Application No. 18194953.8, filed on Sep. 17, 2018. 8 pages.

* cited by examiner

METHOD AND APPARATUS FOR VERIFYING SERVICE OF INSTALLED DEVICES USING RFID

RELATED APPLICATIONS

This application is related to:

U.S. application Ser. No. 15/707,135 filed on Sep. 18, 2017, entitled "Method and Apparatus for Cloud Based Predictive Service Scheduling and Evaluation,";

U.S. application Ser. No. 15/707,142 filed on Sep. 18, 2017, entitled "Method and System for Service Verification Using Access Control System,";

U.S. application Ser. No. 15/707,148 filed on Sep. 18, 2017, entitled "Method and System for Service Verification Using WiFi Signal Strength Mapping,";

U.S. application Ser. No. 15/707,154 filed on Sep. 18, 2017, entitled "Method and Apparatus for Mapping Devices by Using Posted Maps,"; and U.S. application Ser. No. 15/707,167 filed on Sep. 18, 2017, entitled "Method and Apparatus for Evaluation of Temperature Sensors,".

All of the afore-mentioned applications are incorporated herein by this reference in their entirety.

BACKGROUND OF THE INVENTION

Building management systems such as building automation systems, fire alarm systems and intrusion systems are often installed within a premises such as commercial, residential, or governmental buildings. Examples of these buildings include offices, hospitals, warehouses, public infrastructure buildings including subways and bus terminals, multi-unit dwellings, schools or universities, shopping malls, government offices, and casinos.

Fire alarm systems typically include fire control panels that function as system controllers. Fire detection/initiation devices and alarm notification devices are then installed, distributed throughout the buildings and connected to the panels. Some examples of fire detection/initiation devices include smoke detectors, carbon monoxide detectors, flame detectors, temperature sensors, and/or pull stations (also known as manual call points). Some examples of fire notification devices include speakers, horns, bells, chimes, light emitting diode (LED) reader boards, and/or flashing lights (e.g., strobes).

The fire detection devices monitor the buildings for indicators of fire. Upon detection of an indicator of fire such as smoke or heat or flames, the distributed device is activated and a signal is sent from the activated distributed device to the fire control panel. The fire control panel then initiates an alarm condition by activating audio and visible alarms of the fire notification devices of the fire alarm system, which are also distributed around the building. Additionally, the fire control panel will also send an alarm signal to a monitoring station, which will notify the local fire department or fire brigade.

Intrusion systems typically include intrusion panels and their own distributed devices. The distributed monitoring devices detect indications of intrusions, building security breaches and unauthorized access at or within the building and report to the intrusion panels. Examples of monitoring devices include motion sensor devices, door and window relays, thermal sensors, and surveillance camera devices that communicate with the intrusion panel over a security network. Motion sensor devices can detect intrusions and unauthorized access to the premises, and send indications of the intrusions to the security panel. The surveillance camera devices capture video data of monitored areas within the premises, in examples.

Building automation systems will typically include one or more building automation control panels and distributed devices that control and monitor the physical plant aspects of a building and aspects of business-specific electrical, computer, and mechanical systems. The physical plant typically includes heating, ventilation, and air conditioning (HVAC) systems, elevators/escalators, lighting and power systems, refrigeration and coolant systems, and air and/or water purification systems, in examples. HVAC systems typically include air handlers and systems of ducts and vents for circulating air throughout the building. Business-specific systems include computer systems, manufacturing systems that include various types of computer-aided machinery and test equipment, and inventory control and tracking systems, in examples.

Building management systems require service, including installation, repair, testing, inspection, and compliance testing. When the systems are initially installed, the panels are typically located in a secure part of the building. Then, the distributed devices are installed throughout the building. The panels and the distributed devices must then be interconnected. Wired systems are often used. Although, in some cases wireless links are used to provide interconnection. Then later in the lifecycle, repair may be required. Sensor-type distributed devices can be damaged. They can also become dirty. Inspection and compliance testing is also mandatory for many types of building management systems. Fire alarm systems must be tested typically on a yearly basis, for example.

Recently, it has been proposed to use connected services systems to monitor fire alarm systems. Connected services systems are remote systems that communicate with the building management systems and are sometimes administered by separate business entities than the owners and/or occupants of the buildings, which contain the building managements systems. For example, the connected services system can be administered by a building management system manufacturer and/or an entity providing service on the building management systems.

Often during service, the connected services systems communicate with the control panel of a fire alarm system and mobile computing devices operated by on-site technicians. This has allowed the control panels to report status information, including devices events from distributed devices connected to the panels, to the connected services systems. Similarly, this has allowed the mobile computing devices, via mobile applications, to display information about the fire alarm systems, receive local service data, including inspection results, service narrative information and/or service completion status for different distributed devices, and send the local service data to the connected services system. By facilitating communication between the control panels and mobile computing devices, and by collecting and storing device events and local service data, connected services systems have been used to facilitate service on fire alarm systems.

For example, typically, the fire alarm devices are periodically tested by technicians (e.g., monthly, quarterly, or annually depending on fire or building codes) to verify that the distributed devices are physically sound, unaltered, working properly, not obstructed, properly labeled, and located in their assigned locations.

This testing of the distributed devices is often accomplished with a walkthrough test. During an inspection, the connected services system receives device events from the control panel, which originated from the distributed devices and local service data from a mobile computing device, including inspection results. Illustrated by way of example, upon activation of a fire alarm device, the control panel receives a signal from the activated device. Event data are generated and sent to the connected services system. The event data are stored and/or logged by the connected services system and also sent to the mobile computing device in real-time. The on-site technician is able to view the event data and verify that the fire alarm device is physically sound, unaltered, working properly, and in its assigned location. The mobile computing device then sends local service data including inspection results to the connected services system, and the technician moves to test the next fire alarm device.

In some cases, building management system devices and/or testing devices lack direct connectivity to a connected services system. For example, some control panels lack network connectivity and have not been equipped with a gateway device. In another example, distributed devices of the building management system are not connected to the control panel, such as fire extinguishers.

Barcode scanning has also been used to facilitate walkthrough tests. The technician scans barcodes associated with the tested devices to generate identification information for the devices. The testing information and identification information for the devices is then used to create a report.

In radiofrequency identification systems (RFID), RFD reader devices interrogate RFID tags by sending signals to MD tags. In response, the RFID tags respond with identification or other information. In RFID systems, passive RFID tags require interrogation by the RFID readers for power and do not transmit unless interrogated. Active REID tags are powered independently (for example, by a battery) and responsively transmit signals containing information such as identification information.

SUMMARY OF THE INVENTION

Certain types of service for building management systems are mandated by regulations. Entities can be audited by local regulatory bodies in order to verify that the services were completed. If the customer does not have such verification, their business could be impacted and the service can be required to be repeated and verified.

At the same time entities performing the service often want confirmation that the technician actually performed the service. Specifically, many types of service simply require the technician to observe the state of a device. That is, the technician determines whether the device has been damaged or covered over, is fully charged, and/or is located at its assigned position. The service entity at some level has to trust that the technician actually performed this job.

It is desirable to have a system that can verify that technicians providing service were in the area of the devices needing service and actually remained in that area for a period of time consistent with that generally required for designated service procedures, and record all relevant service details. This allows the service entity to audit the technicians work.

In particular, the method of servicing building management systems using barcode scanning presents significant problems for auditors reviewing service records, because the data can be compromised by a technician, for example, by scanning a list of barcodes in a book and then marking the service as completed or a test as passed, rather than actually performing the service or testing.

According to the present invention, wireless transmitters, such as radiofrequency identification (RFID) tags, are included in each distributed device or control panel to be serviced. A mobile computing device, which can be a smart phone or a specialized reader device, among other examples, is used to read wireless signals from the wireless transmitters of the serviced devices. Identification information, such as the serial number of an RFID tag, is recorded, along with signal strength detected between the mobile computing device and the wireless transmitter. The signal strength information is retained as evidence that the technician was actually present at the serviced device and performed the required service.

This invention can also be used to track the location of mobile equipment such as hospital crash carts. Monitoring devices that detect wireless signals from the wireless transmitter on the mobile equipment can be installed throughout a building. Identification information for the monitoring device that detected the wireless signals, identification information for the mobile equipment, and signal strength information is then sent to the connected services system and is used to verify that services were actually performed using the mobile equipment.

In general, according to one aspect, the invention features a service management system for facilitating testing of devices of a building management system. The service management system includes mobile computing devices, a service workflow module, and a validation module. The mobile computing devices detect wireless signals generated from wireless transmitters of the devices, determines identification information for the devices in the wireless signals and signal strength information for the wireless signals, and generates local service data using the identification information. The service workflow module receives the local service data from mobile computing devices and generates service events. The validation module analyzes the service events and the signal strength information to validate the service to the devices.

In embodiments, the mobile computing devices are smart phones or radiofrequency identification reader devices, and the wireless transmitters are radiofrequency identification tags or Bluetooth low energy transmitters that can be integral components of the devices or attached to the exterior of the devices. The validation module validates service to the devices by determining if the signal strength information indicates that the signal strength of the detected wireless signals are above a predetermined threshold. The devices include distributed devices, control panels, and/or devices of the building management system that are not connected to a control panel or to a connected services system.

In general, according to another aspect, the invention features a method for facilitating testing of devices of a building management system. Mobile computing devices detect wireless signals generated from wireless transmitters of the devices, determine identification information for the devices in the wireless signals and signal strength information for the wireless signals, generate local service data using the identification information and service events from the local service data. The service events and signal strength information are then analyzed to validate the service to the devices.

In general, according to another aspect, the invention features a method for validating services provided using mobile equipment of a building. Devices in different zones of the building detect beacons generated from the mobile equipment, and identification information for the mobile equipment and signal strength information for the beacons are determined. Local service data using the identification information are generated, and, in turn, service events are generated from the local service data. The signal strength information and service events are then analyzed to validate the services performed using the mobile equipment.

In general, according to another aspect, the invention features a method for facilitating service on building management systems of a building comprising a service workflow module receiving device events from devices of the building management system and pushing status information for the devices to mobile computing devices operated by technicians performing service on the building management systems.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
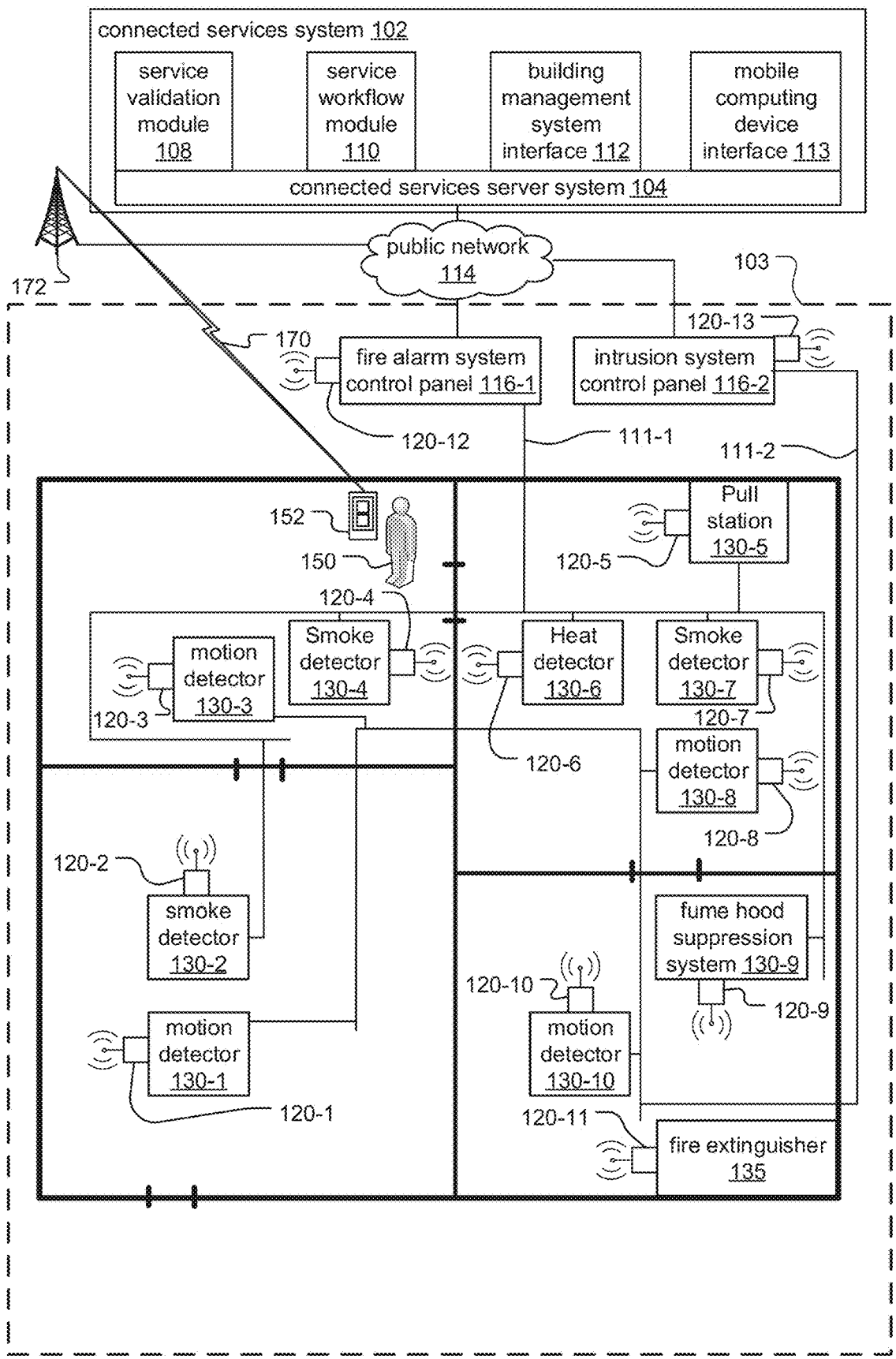
FIG. 1 is a schematic diagram of a service management system according to an embodiment of the current invention.

FIG. 1 is a schematic diagram of a service management system according to an embodiment of the current invention.

The service management system includes a connected services system 102, which, at a high level, communicates with building management systems installed within buildings 103 of various client entities, typically. Examples of client entities include residential, commercial, or governmental companies or agencies. Examples of the buildings include offices, hospitals, warehouses, retail establishments, shopping malls, schools, multi-unit dwellings, government buildings, or casinos, to list a few examples.

In general, the building management systems include control panels 116 and distributed devices 130. The control panels 116 direct the function of the respective building management system by determining and displaying the operational status of or sensor data from the distributed devices 130.

The distributed devices 130 are connected to their respective control panels 116 via safety and security wired and/or wireless networks 111 of the building 103. These networks 111 support data and/or analog communication between the distributed devices 130 and the respective control panels 116. In some embodiments (not illustrated), the distributed devices 130 could all be connected to the same safety and security network 111.

In the illustrated example, distributed devices 130 of the fire alarm system are connected to a fire alarm system control panel 116-1 via safety and security network 111-1 and are slave devices of the panel.

The distributed fire alarm devices 130 include alarm initiation devices including smoke detectors 130-2, 130-4, 130-7, heat detectors 130-6 and manually activated devices such as pull stations 130-5. Alarm initiation devices can also include devices that are not depicted in the illustrated example, including call points and carbon monoxide detectors. The alarm initiation devices monitor the buildings for indicators of fire. Upon detection of indicators of fire, device signals are sent from the alarm initiating devices to the control panel. The device signals are typically alarm signals and/or analog values. The alarm signals are used to signal the control panel 116-1 that a fire has been detected. Alternatively, some devices provide analog values to indicate measured conditions. In one example, temperature sensors provide analog values for measured temperatures. In another example, smoke sensors provide analog values indicating smoke obscuration levels. The control panel 116-1 then determines if the analog values are indicative of a fire. Additionally, in some examples, the alarm initiation devices provide both alarm signals and analog values.

The distributed fire alarm devices 130 could further include fire notification devices (not illustrated), which notify occupants of the building 103 of a potential fire and generally include speakers, horns, bell, chimes, light emitting diode (LED) reader boards, and/or flashing lights (e.g., strobes), to list a few examples. In response to detection of indicators of fire, the fire alarm system control panel 116-1 initiates an alarm state, which activates the fire notification devices.

The distributed fire alarm devices 130 could further include suppression devices, such as fume hood suppression systems 130-9, which include a series of metal links surrounding a wire within the ductwork of a hood system, for example, of grill in a restaurant. In the presence of excessive heat, one or more of the metal links break, causing the wire to slacken, which in turn activates the release of a chemical agent for suppressing fire. The release mechanism of the canister containing the fire suppression agent includes an electrical relay, which sends a signal to the fire alarm system control panel 116-1 indicating that the release mechanism has been activated. In order to test these fume hood suppression systems 130-9, the technician 150 disables the canister before activating the release mechanism so that no fire suppression agent is actually released during testing.

Similar to the fire alarm system, distributed devices 130 of the intrusion system are connected to an intrusion system control panel 116-2 via a second network 111-2.

The distributed intrusion devices 130 include devices for detecting the presence of unauthorized individuals in the building 103, including motion detectors 130-1, 130-3, 130-8, 130-10 and other devices (not illustrated) such as security cameras, door and window relays and network video recorders, among other examples. Upon detection of the presence of unauthorized individuals, device signals are sent from the motion detectors 130-1, 130-3, 130-8, 130-10 to the intrusion control panel 116-2.

Also included is an unconnected device 135, which, in the illustrated example is a fire extinguisher. In general, unconnected devices 135 are devices of building management systems that do not connect to the control panel 116 of the building management system or to the connected services system 102. In other examples, the unconnected devices 135 include eyewash stations, sprinkler heads and sprinkler valves.

All of the control panels 116, distributed devices 130 and unconnected devices 135 are equipped with wireless transmitters 120, which transmit radiofrequency (RF) signals containing identification information associated with the devices to which they are attached. The identification information can include a serial number of the wireless transmitter or a unique device identifier for the device 116, 130, 135, among other examples. In different embodiments, the wireless transmitters 120 are radiofrequency identification (RFID) tags or Bluetooth low energy transmitters. The wireless transmitters 120 can be integral components of the devices 116, 130, 135 or attached to the exterior of those devices.

The present system can be extended to other types of building management systems. For example in another implementation the panel is a building automation panel such as a panel that might control building climate including HVAC.

In the illustrated example, a technician 150 holding a mobile computing device 152 is also shown. The technician 150 is an individual performing service on the building management systems, including employees of entities occupying the building 103, property managers, building management system manufacturers and/or providers of service for building management systems.

The mobile computing device 152 presents information about the building management systems, including real time status information of the distributed devices 130 such as whether signals have been received from those devices by the control panels 116 and date and time information pertaining to the received signals, receives local service data, including inspection results, service narrative information and/or service completion status for different devices, and sends the local service data to the connected services system 102. The mobile computing device 152 also detects wireless signals from the wireless transmitters 120, reads identification information from the wireless signals and generates and records signal strength information including signal strength measurements of the wireless signals. The identification information and signal strength information are sent to the connected services system 102 along with the local service data. In the illustrated example, the mobile computing device 152 is a smartphone device. Alternatively, the mobile computing device 152 could be an MD reader device, laptop computer, tablet computer, phablet computer (i.e., a mobile device that is typically larger than a smart phone, but smaller than a tablet), smart watch, or specialized service and/or testing device to list a few examples.

Each of the fire alarm system control panel 116-1, intrusion system control panel 116-2, and mobile computing device 152, are connected to the connected services system 102 via a leased data connection, private network and/or public network 114, such as the internet. In some cases, the control panels 116 have been given network connectivity to communicate with the connected services system 102; in other cases, testing computers connected to the control panels 116 function as gateways. The mobile computing device 152 connects to the public network 114 via a wireless communication link 170 to a cellular radio tower 172 of a mobile broadband or cellular network or public and/or private wired data networks such as an enterprise network, Wi-Max, or network, for example.

The connected services system 102 is typically implemented as a cloud system. It can be run on a proprietary cloud system or implemented on one of the popular cloud systems operated by vendors such as Alphabet Inc., Amazon, Inc. (AWS), or Microsoft Corporation.

As a result, the connected services system 102 typically operates on a connected services server system 104. In some cases, this server system 104 is one or more dedicated servers. In other examples, they are virtual servers.

The connected services server system 104 executes a number of separate modules, including a service validation module 108 and a service workflow module 110. Each of these modules is associated with separate tasks. In some cases, these modules are discrete modules or they are combined with other modules into a unified code base. They can be running on the same server or different servers, virtualized server system or a distributed computing system.

The service workflow module 110 functions as an application server that communicates with the mobile computing device 152 operated by the technician 150. The service workflow module 110 provides the steps necessary for the technician 150 to service the building management system. The service workflow module 110 further receives the local service data provided by the technician 150 indicating that a particular panel 116 or distributed device 130 of the building management system has been serviced. This local service data may further include inspection results, narrative description from the technician describing the state of a particular panel 116 or distributed device 130 a description of its particular location, and/or notes concerning that panel or distributed device that might be useful for the next service. Further, the service workflow module 110 also receives device events from the particular panel 116 or distributed device 130 undergoing service and combines the device events with the local service data and then stores the resulting service events to a connected services database in connection with the particular service being carried out on the building management system.

Status information for the distributed devices 130 based on the device events is also pushed from the service workflow module 110 to the mobile computing device 152 to be displayed to the technician 150 in order to facilitate testing. For example, in response to activation of distributed devices 130 by the technician 150, the service workflow module 110 sends status information based on device events from the devices to the mobile computing device 152, which displays the status information to the technician 150. In this way, the technician 150 can determine how the distributed devices 130 responded in real time.

Additionally, the service workflow module 110 receives the identification information and signal strength information generated by the mobile computing device 152 from detecting the wireless signals from the wireless transmitters 120.

The connected services system 102 also includes a building management system interface 112 and a mobile computing device interface 115.

The building management system interface 112 operates as the interface between the service workflow module 110 and the particular control panel 116 undergoing service. In particular, the building management system interface 112 converts instructions from the service workflow module 110 into instructions that are formatted into the protocol implemented by the particular panel. Additionally, the building management system interface 112 receives information such as device events from the current control panel 116 or distributed device 130 under service and converts those device events into a uniform format that can be consumed by the service workflow module 110, regardless of the underlying protocol implemented by the panels and distributed devices.

The mobile computing device interface 115 operates as an interface between the service workflow module 110 and mobile computing devices 152 used by technicians 150 performing the service. In particular, the mobile computing device interface 115 puts the identification information and signal strength information into a uniform format that can be consumed by the service workflow module 110 and/or the service validation module 108.

The service validation module 108 communicates with the service workflow module 110 in order to validate service being performed on the building management system undergoing service. In particular, the service validation module 108 receives service events, including real time service information from the service workflow module 110 or possibly historical service information. Along with the service events, the service validation module 108 also receives identification information and signal strength information from the wireless transmitters 120. The service validation module 108 further compares the service events, including the time at which the service events were generated, the identification information and signal strength information from the wireless transmitters 120 to ensure coherency.

Figure 2:
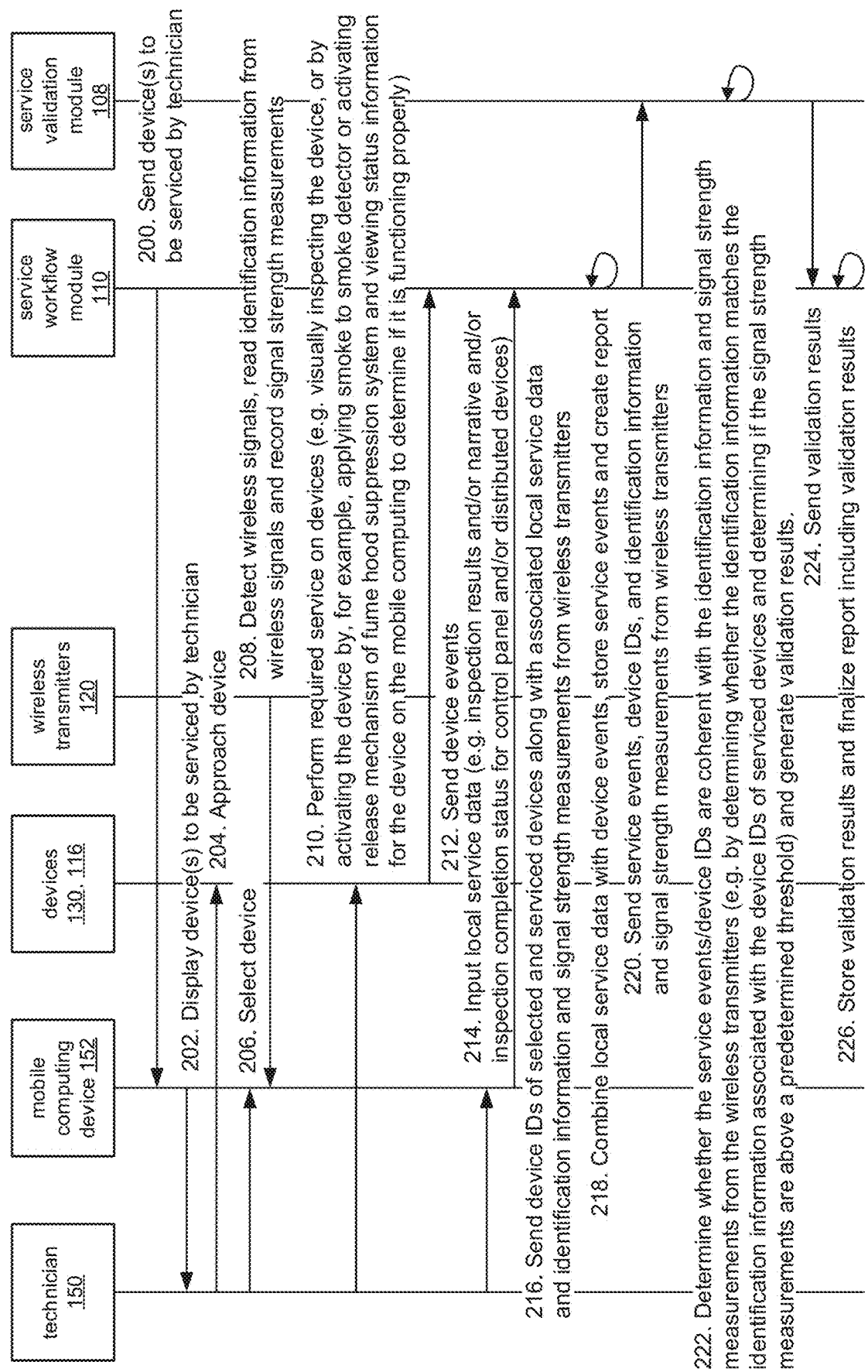
FIG. 2 is a sequence diagram illustrating the process by which the validation module validates service on the building management system.

FIG. 2 is a sequence diagram illustrating the process by which the validation module 108 validates service on the building management system.

In step 200, the service workflow module 110 sends the devices to be serviced (such as distributed devices 130 or control panels 116) to the mobile computing device, which displays them to the technician in step 202.

In step 204, the technician 150 approaches a device 130, 116 and, in step 206, selects the device via the mobile computing device 152.

In step 208, the mobile computing device 152 detects wireless signals from the wireless transmitter 120 of the selected device, reads identification information from the wireless signals, and records signal strength information including signal strength measurements of the wireless signals. This can be accomplished by the technician 150 scanning an MD tag with an MD reader device or reading wireless signals from a Bluetooth low energy transmitter using a smart phone, among other examples.

in step 210, the technician 150 performs the required service. This can include simply visually inspecting the device, or activating the device, for example, by applying smoke (to a smoke detector), or executing diagnostics on a control panel 116, among other examples.

In one example, the technician 150 activates the release mechanism of the fume hood suppression system 130-9, which, in response, sends a signal to the fire alarm system control panel 116-1. The panel sends device events to the service workflow module 110 including an indication that the signal was received and date and time information for the event. Status information for the fume hood suppression system 130-9 based on the device events is then pushed to the mobile computing device 152 in real time, allowing the technician 150 to confirm that the fume hood suppression system 130-9 is functioning properly.

In step 212, the serviced distributed device 130 or control panel 116 sends device events to the service workflow module 110. For distributed devices 130, the device events would be generated and sent by the control panel 116 in response to receiving alarm signals and/or sensor values from the distributed device 130.

In step 214, the technician inputs local service data into the mobile computing device 152, and in step 216, the local service data is sent to the service workflow module 110 along with device IDs of the selected and serviced devices, and the identification information and signal strength information from the wireless transmitters 120.

The service workflow module 110 combines the local service data with the device events, generating service events, stores the service events, and creates a report in step 218.

In step 220, the service workflow module 110 sends the service events, device Ds of the selected and serviced devices and the identification information and signal strength information from the wireless transmitters 120 to the service validation module 108. In step 222, the service validation module determines whether the service events and device IDs of the selected and serviced devices are coherent with the identification information and signal strength information from the wireless transmitters 120. For example, this is accomplished by determining whether the identification information from the wireless transmitters 120 matches and/or is associated with the device IDs of the selected and serviced devices. In another example, the service validation module 108 determines whether the signal strength information indicate that the signal strength was above a predetermined threshold, which would indicate that the mobile computing device 152 actually was in the vicinity of the serviced device at the time the service was performed.

in step 224, the service validation module 108 returns validation results to the service workflow module 110, and, in step 226, the validation results are stored and the report is finalized to include the validation results.

Figure 3:
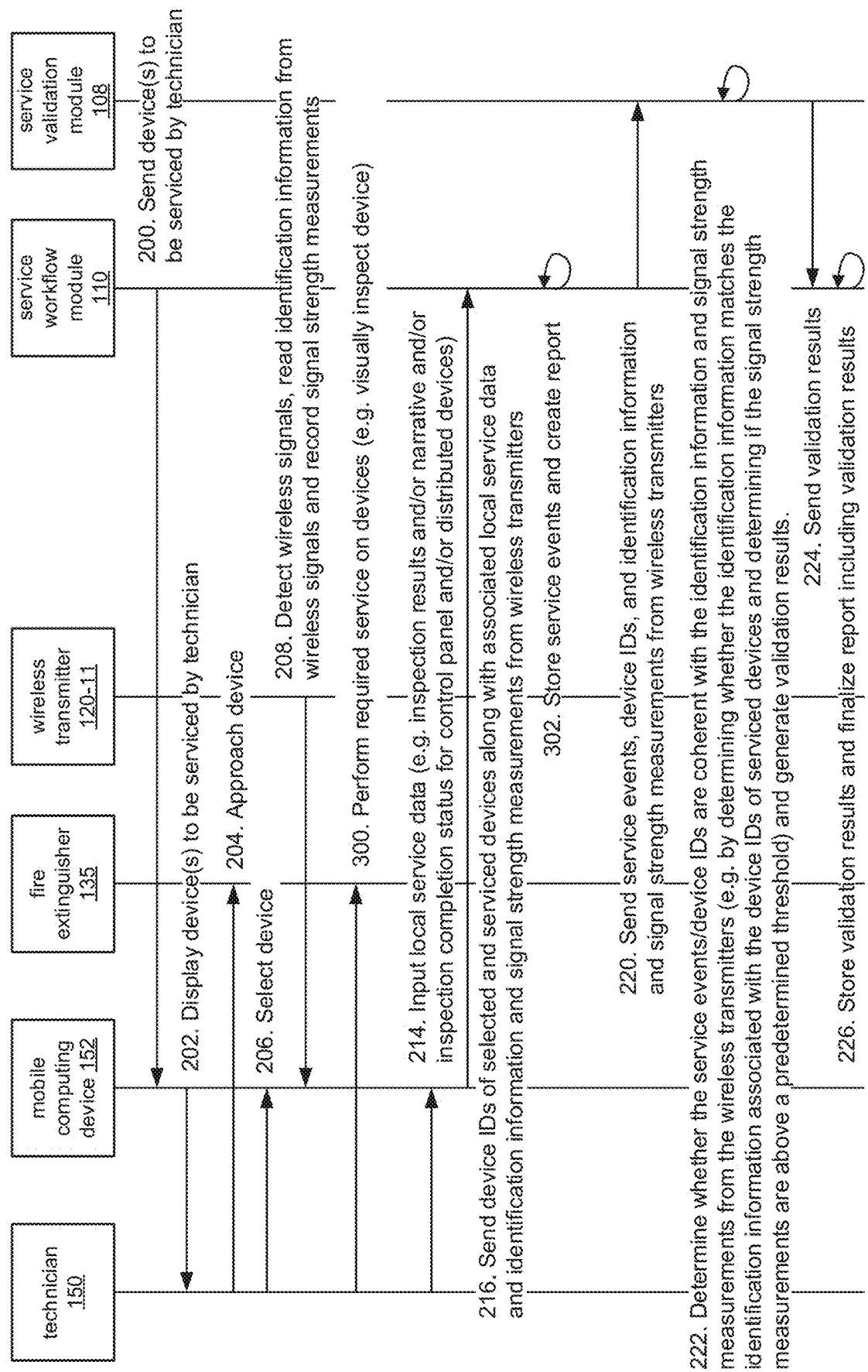
FIG. 3 is a sequence diagram illustrating the process by which the validation module validates service on unconnected devices such as fire extinguishers of the building management system.

FIG. 3 is a sequence diagram illustrating the process by which the validation module 108 validates service on unconnected devices 135 such as fire extinguishers of the building management system.

Steps 200 through 208 proceed as previously described.

Now, however, in step 300, the technician performs the service on the unconnected device 135, which does not send device events to the service workflow module 110. In the illustrated example, the unconnected device 135 being serviced is a fire extinguisher. However, the unconnected devices 135 can also include eyewash stations, sprinkler heads and sprinkler valves, among other examples.

The local service data are input and sent to the service workflow module 110 as previously described in steps 214 and 216.

As before, in step 302, the service workflow module 110 generates and stores service events and creates a report. However, the service events include only local service data.

Steps 220 through 226 then proceed as previously described, as the validation module 108 validates the service on the unconnected device.

In this way, service on unconnected devices 135 that do not communicate with the connected services system 102 is validated and documented. In addition to fire extinguishers, the unconnected devices 135 can also include distributed devices 130 and control panels 116 of building management systems that do not connect directly to a connected services system 102, among other examples.

Figure 4:
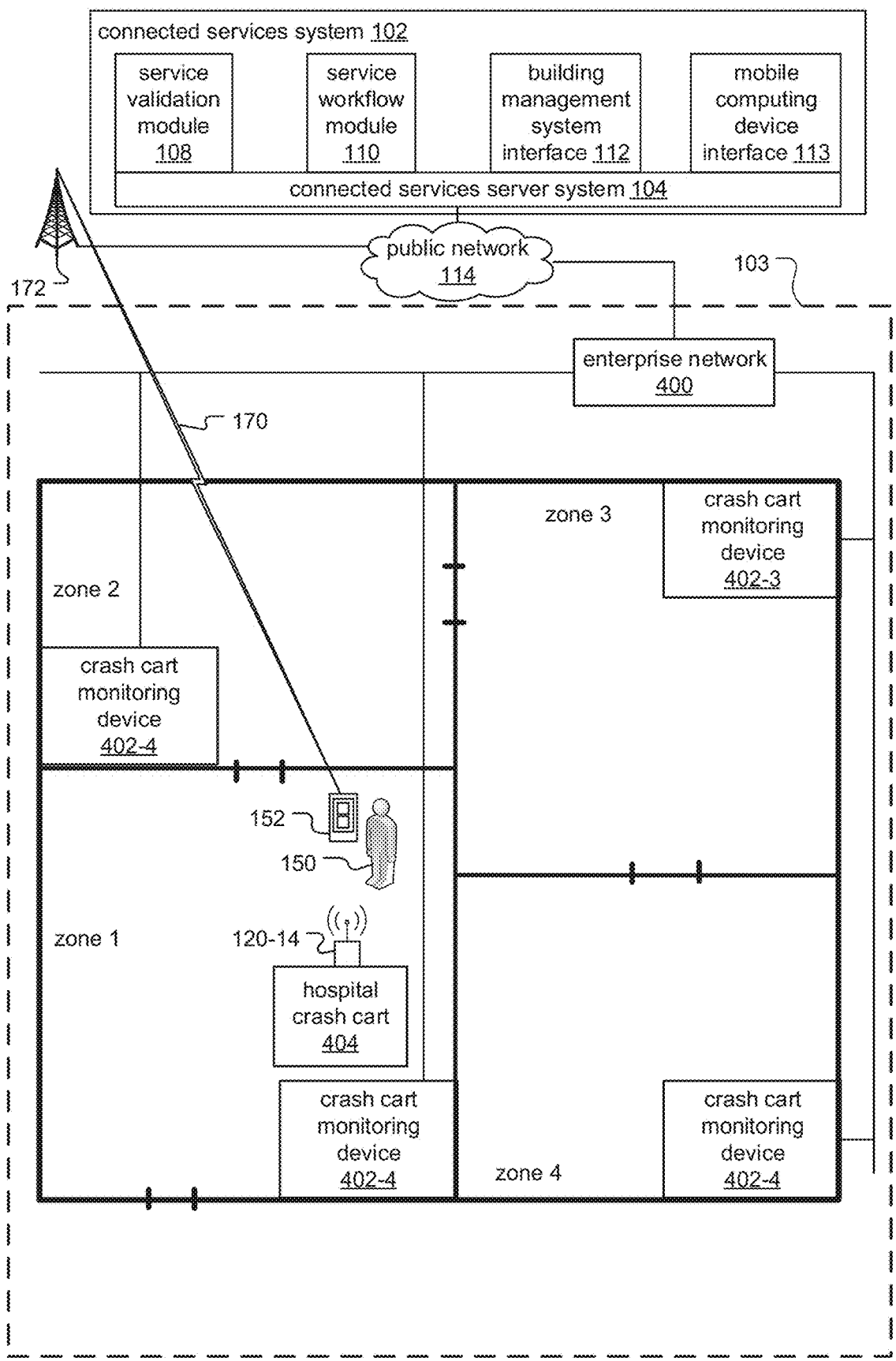
FIG. 4 is a schematic diagram of a service management system according to an alternative embodiment of the current invention.

FIG. 4 is a schematic diagram of a service management system according to an alternative embodiment of the current invention.

The system is similar to that depicted in FIG. 1. Here, however, a series of monitoring devices 402 are distributed throughout zones 1, 2, 3 and 4 of the building 103. The monitoring devices 402 connect to the public network 113 via a wired and/or wireless enterprise network 400. The technician 150 performs service using the mobile computing device 152 and mobile equipment 404, which is a piece of equipment used to perform service for which the location in the building is tracked by the monitoring devices 402. As before, the wireless transmitter 120-14 of the mobile equipment 404 transmits wireless signals containing Identification information.

In the illustrated example, the building 103 is a hospital, the technician 150 is a health care provider, and the mobile equipment 404 is a hospital crash call.

Figure 5:
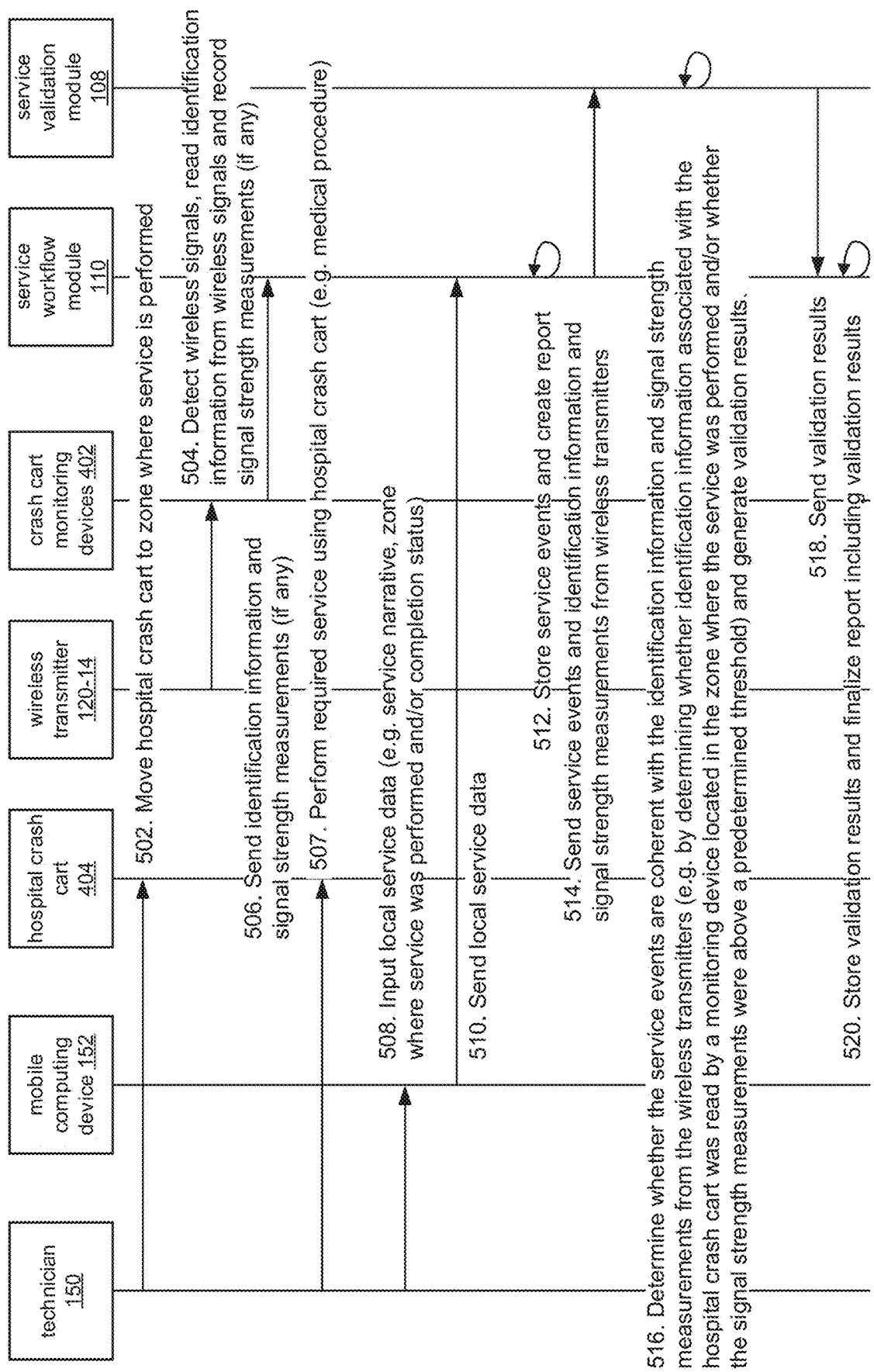
FIG. 5 is a sequence diagram illustrating the process by which the validation module validates service performed using mobile equipment.

FIG. 5 is a sequence diagram illustrating the process by which the validation module 108 validates service performed using the mobile equipment 404.

In step 502, the technician 150 moves the mobile equipment 404 the zone in which the service is to be performed.

In step 504, the monitoring device 402 in the zone containing the mobile equipment 404 detects wireless signals from the wireless transmitter 120-14, reads identification information from the wireless signals, and generates signal strength information including signal strength measurements of the wireless signals. The monitoring devices 402 in other zones do not detect wireless signals from the wireless transmitter 120-14, as they are out of range.

In step 506, the monitoring device 402 in the zone containing the mobile equipment 404 sends the identification information and signal strength information to the service workflow module.

In step 507, the technician 150 performs the required service. In one example, the technician 150 uses a hospital crash cart to perform a medical procedure.

In step 508, the technician 150 inputs local service data, including, for example, a service narrative, zone information for the service, and/or a service completion status.

In step 510, the mobile computing device 152 sends the local service data to the service workflow module 110, which generates and stores service events and creates a report.

in step 514, the service workflow module 110 sends the service events and identification information and signal strength information from the wireless transmitter 120-14 to the service validation module 108, which determines whether the service events are coherent with the identification information and signal strength information from the wireless transmitter 120-14 in step 516. This is accomplished by, for example, determining whether the identification information is associated with the mobile equipment 404 used in the service, whether the wireless signals from the wireless transmitter 120-14 were detected by the monitoring device 402 located in the zone where the service was performed and/or whether the signal strength information is above a predetermined threshold. The service validation module 108 generates validation results, which are returned to the service workflow module 110 in step 518.

In step 520, the service workflow module 110 stores the validation results and finalizes the report to include the validation results.

In another embodiment (not illustrated), the monitoring devices 402 transmit wireless signals via wireless transmitters 120, and the mobile equipment 404 detects the wireless signals from the monitoring devices 402 via wireless receivers. In this example, the service validation module 108 determines whether identification information associated with the monitoring device 402 located in the zone where the service was performed was read the mobile equipment 404 and/or whether the signal strength measurements were above a predetermined threshold.

While this invention has been particularly shown and described with references to preferred embodiments thereof, it will be understood by those skilled in the art that various changes in form and details may be made therein without departing from the scope of the invention encompassed by the appended claims.

What is claimed is:

1. A service management system for facilitating testing of devices of a building management system, comprising:
mobile computing devices for detecting wireless signals generated from wireless transmitters of the devices and determining identification information for the devices in the wireless signals and determining signal strength information for the wireless signals, and generating local service data using the identification information;
a service workflow module for receiving the local service data from mobile computing devices and generating service events from the local service data; and
a validation module for analyzing the service events and the signal strength information to validate the service to the devices.

2. The system as claimed in claim 1, wherein the mobile computing devices are smart phones and/or radio-frequency identification reader devices.

3. The system as claimed in claim 1, wherein the wireless transmitters are radio-frequency identification tags and/or Bluetooth low energy transmitters.

4. The system as claimed in claim 1, wherein the wireless transmitters are integral components of the devices and/or are attached to the exterior of the devices.

5. The system as claimed in claim 1, wherein the validation module validates service to the devices by determining if the signal strength information indicates that the signal strength of the detected wireless signals are above a predetermined threshold.

6. The system as claimed in claim 1, wherein the devices include devices of the building management system that are not connected to a control panel of the building management system or to a connected services system.

7. The system as claimed in claim 1, wherein the devices include distributed devices and/or control panels.

8. The system as claimed in claim 1, wherein the validation module validates the service to the devices by determining whether the service events and identification information for serviced devices are coherent with the identification information and signal strength information from the wireless transmitters.

9. The system as claimed in claim 1, wherein the validation module validates the service to the devices by determining whether the signal strength information indicates that the mobile computing device was in vicinity of the serviced device at a time when the service was performed.

10. The system as claimed in claim 1, wherein the signal strength information is retained as evidence that a technician was present at a serviced device.

11. The system as claimed in claim 1, wherein the local service data indicates that particular devices of the building management system have been serviced.

12. The system as claimed in claim 1, wherein the local service data includes inspection results and/or narrative description of the service from a technician performing the service.

13. The system as claimed in claim 1, wherein the service events include real time and/or historical service information for installation, repair, testing, inspection, and compliance testing services being carried out on the building management system.

14. The system as claimed in claim 1, wherein the service workflow module creates a report including the service events and validation results for the service events generated by the validation module based on the signal strength information.

15. The system as claimed in claim 1, wherein the mobile computing devices receive input from technicians indicating the local service data.

16. The system as claimed in claim 8, wherein the validation module determines whether the service events and identification information for serviced devices are coherent with the identification information and signal strength information from the wireless transmitters by determining whether the identification information from the wireless transmitters matches identification information for devices that were serviced according to the service events and determining whether the signal strength information indicates that the signal strength was above a predetermined threshold, indicating that that mobile computing devices were in vicinity of the serviced devices at times that services were performed according to the service events.

17. The system as claimed in claim 1, wherein the wireless transmitters are attached to each device of the building management system and transmit wireless signals containing identification information associated with the devices to which the wireless transmitters are attached.

18. A method for facilitating testing of devices of a building management system, comprising:
mobile computing devices detecting wireless signals generated from wireless transmitters of the devices, determining identification information for the devices in the wireless signals, determining signal strength information for the wireless signals, generating local service data using the identification information and generating service events from the local service data; and
analyzing the service events and the signal strength information to validate the service to the devices.

19. The method as claimed in claim 18, wherein the mobile computing devices are smart phones and/or radio-frequency identification reader devices.

20. The method as claimed in claim 18, wherein the wireless transmitters are radio-frequency identification tags and/or Bluetooth low energy transmitters.

21. The method as claimed in claim 18, wherein the wireless transmitters are integral components of the devices and/or are attached to the exterior of the devices.

22. The method as claimed in claim 18, further comprising validating service to the devices by determining if the signal strength information indicates that the signal strength of the detected wireless signals are above a predetermined threshold.

23. The method as claimed in claim 18, wherein the devices include devices of the building management system that are not connected to a control panel of the building management system or to a connected services system.

24. The method as claimed in claim 18, wherein the devices include distributed devices and/or control panels.

25. A method for validating services provided using mobile equipment of a building, comprising:
devices in different zones of the building detecting beacons generated from the mobile equipment;
determining identification information for the mobile equipment in the beacons, and determining signal strength information for the beacons;
generating local service data using the identification information and generating service events from the local service data; and
analyzing the service events and signal strength information to validate the services performed using the mobile equipment.

* * * * *